W. A. TURBAYNE.
REGULATING MEANS FOR ELECTRIC GENERATORS.
APPLICATION FILED APR. 27, 1914.
1,196,618.  Patented Aug. 29, 1916.
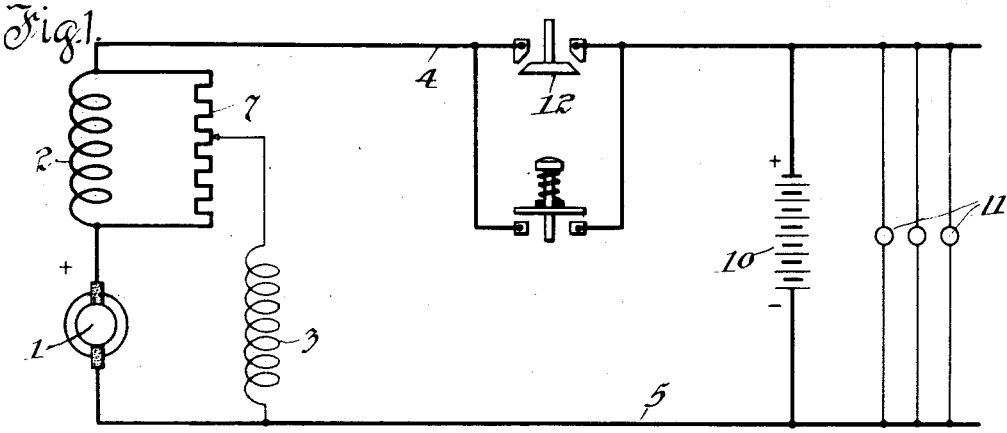
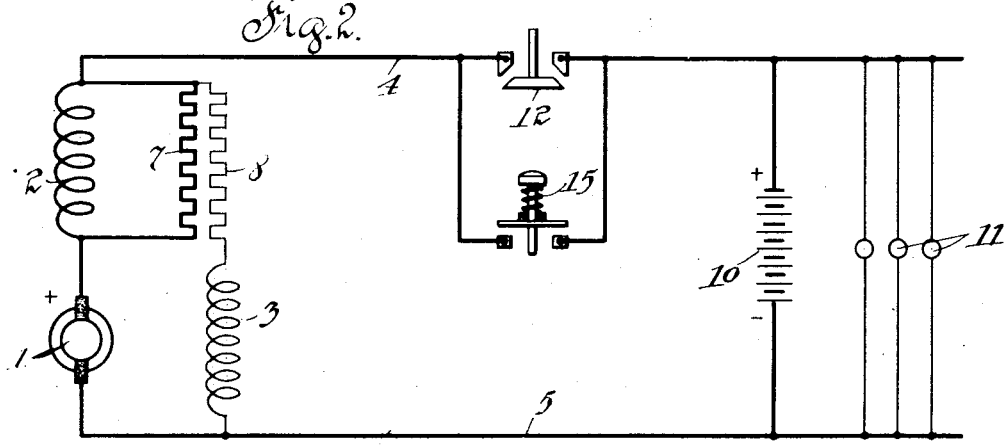
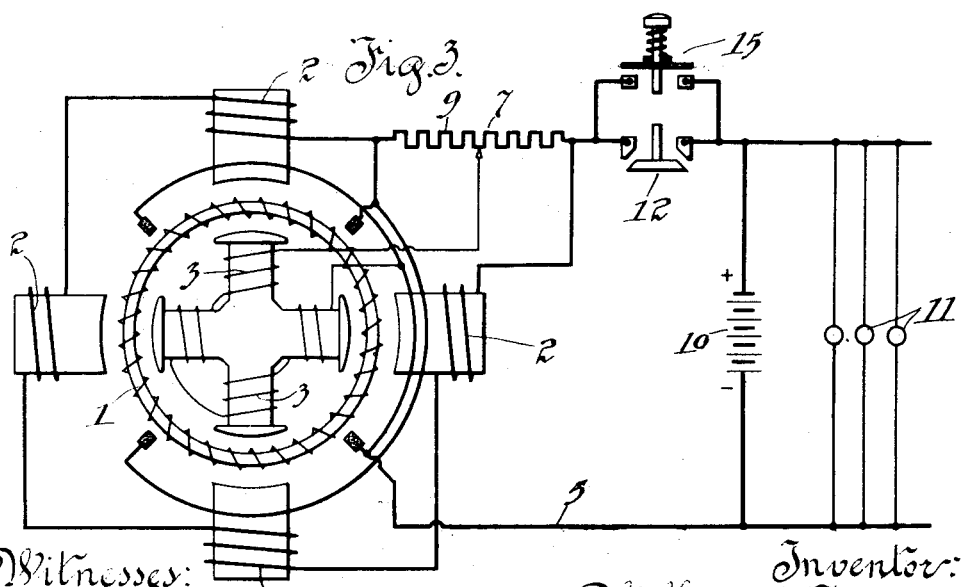
Witnesses:  Inventor:
William A. Turbayne
by Edwin B. H. Tower Jr. atty

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATING MEANS FOR ELECTRIC GENERATORS.

1,196,618.   Specification of Letters Patent.   Patented Aug. 29, 1916.

Application filed April 27, 1914. Serial No. 834,839.

*To all whom it may concern:*

Be it known that I, WILLIAM A. TURBAYNE, a citizen of the United States, residing at Niagara Falls, in the county of Niagara and State of New York, have invented new and useful Improvements in Regulating Means for Electric Generators, of which the following is a full, clear, concise, and exact description, reference being had to the accompanying drawing, forming a part of this specification.

This invention relates to regulating means for electric generators.

The invention is particularly applicable to variable speed battery charging generators such as are used in train lighting, or in automobile starting and lighting systems.

An object of the invention is to provide improved regulating means for controlling both the shunt and the differential fields of a differentially wound generator.

In the drawings: Figure 1 is a diagrammatic illustration of a system embodying the invention: Fig. 2 is a modification thereof: Fig. 3 is a diagram of an internal and external pole generator to which this invention is applied.

In applying this invention to a differentially wound generator, a resistance having a positive temperature co-efficient is placed in series with the shunt field and a similar resistance is arranged in shunt around the series differential winding.

In the system shown in Fig. 1, a generator having an armature 1 is provided with a differential series winding 2 and a shunt field winding 3. A resistance 7 having a positive temperature co-efficient is arranged in shunt to the series winding 2. One terminal of the shunt winding is connected to the middle portion of this resistance so that the resistance will carry the current passing into the shunt field winding as well as the current diverted from the series winding. As the machine begins to operate, it builds up as a shunt generator under the influence of the shunt winding 3. Current flows through the resistance 7, but at lower values of the voltage no appreciable effect is produced. When the voltage of the machine has reached the proper value, an automatic switch 12 closes the circuit to the storage battery 10 and lamps 11.

In low voltage machines, such as are generally used in automobile starters, the shunt field current is a considerable portion of the total current delivered by the generator, and the heating effects of this current may be readily utilized in connection with an iron wire shunt connected, as described, to cause an increase in the resistance of the shunt. In such a machine, any tendency toward an increase of voltage will result in a tendency to increase the generator current and, furthermore, as the C. E. M. F. of the battery, and therefore the voltage across the generator brushes increases during the progress of the battery charging, the generator output will tend to increase. This tendency toward increased output will cause a greater current to flow through the shunt field winding, which in traversing the iron wire shunt will cause an increase in temperature of the shunt and in conjunction with the increase in temperature, caused by the current shunted from the series winding, will cause a decided increase in the resistance of the shunt. This will cause a diversion of more current through the series field winding, which acting in conjunction with the reduced current through the shunt field winding, will limit the generator output to predetermined values regardless of increase in generator speed or rise in battery voltage.

In Fig. 2 there is shown a modification of the arrangement of Fig. 1 in which the resistance 8 in series with the shunt winding 3 is separate from the resistance 7 which forms a shunt across the differential field 2. The two resistances, 7 and 8, are so disposed that the temperature rise due to the current flowing through each will affect the other. The current flowing through the shunt field 3 heats the iron wire resistance 8 and this in turn imparts its heat to the shunt 7 which is arranged in juxtaposition therewith. The temperature rise of either one of these resistances will mutually affect the other and hence any tendency to increase the voltage or the current beyond certain values will be followed by an increase of resistance in the iron wires. In both the arrangements shown this causes the current in the shunt field winding to be prevented from increasing in proportion to the increase in voltage while the current through the series differential winding will be increased in greater proportions than the changes in the line current. The result of these actions is a tendency toward stability of output of the machine.

Fig. 3 shows a particular type of machine which has been described and claimed in Serial No. 738,629, filed by me December 26, 1912, to which the present invention may be advantageously applied.

A shunt winding 3 is disposed on poles internal to the armature 1 and the series field winding is disposed on the poles external to the armature 1. The iron wire shunt is connected across the series field with the shunt field winding 3 connected to include a portion 9 thereof, as described in connection with Fig. 1. The modification shown in Fig. 2 may equally well be applied to this type of machine.

The machine shown in Fig. 3 may be employed for automobile starting purposes. When the starting switch 15 is closed the first heavy rush of current will heat the iron resistance wire to such a degree as to render the shunt field of little moment and to raise the resistance of the shunt around the series winding to such a value that the machine operates substantially as a series motor. The current that flows in the shunt winding aids the flux produced by the series winding.

It is obvious from the above description that a system has been devised which tends to limit the output after a certain voltage has been attained. The current flowing through the shunt field is utilized to heat an iron shunt around the series field winding to cause an increase of resistance in said shunt. This increase of resistance diverts the current through the differential winding and tends to reduce the working flux of the dynamo. As the voltage across the generator brushes rises, due to rise in the counter-electromotive force of the battery as the charge of the battery nears completion, the generator output tends to increase. This increase in voltage tends to send more current through the shunt field winding which causes an increase in temperature of the iron shunt which together with the increase of temperature caused by the current shunted from the series winding, brings about a decided increase in the resistance of the iron shunt. Consequently, more current flows through the differential series winding and the result is that the generator output is held to a much lower value and to a closer regulation than if the iron shunt were not employed.

While a particular embodiment of the invention has been described, the invention is not limited to any of the details shown or described except as such limitations may be imposed in the appended claims.

What I claim as new and desire to secure by Letters Patent of the United States is:

1. In a system of the class described, a dynamo electric machine having a series field winding and a shunt field winding, and means directly influenced by the total current in the shunt winding to control the current in the series winding.

2. In a system of the class described, a dynamo electric machine having a series field winding and a shunt field winding, and means in shunt to said series field winding influenced by the current output of said machine to control the current in the shunt field winding.

3. In a system of the class described, a dynamo electric machine having a series field winding, a shunt field winding and means in shunt to said series field winding influenced by the current output of said machine to control the resistance of the shunt field winding.

4. In a system of the class described, a dynamo electric machine having a series field winding, a shunt field winding, and a two part resistance having a positive temperature co-efficient, one part thereof in shunt to said series winding and another part thereof in series with said shunt winding, each of said parts adapted to mutually influence the resistance of the other with variations of current through said part.

5. In combination, a dynamo electric machine provided with a ring wound armature and a field having poles external and internal with respect to said armature, series windings on one set of poles, shunt windings on the other set of poles, and a resistance having a positive temperature co-efficient arranged in shunt to said series field windings, said shunt field windings having one terminal connected to an intermediate point on said resistance.

In witness whereof, I have hereunto subscribed my name in the presence of two witnesses.

WILLIAM A. TURBAYNE.

Witnesses:
   E. P. HANNIG,
   W. G. HEIST.